Sept. 24, 1968  E. M. CONWAY  3,402,471
APPARATUS FOR MEASURING BOARD FOOTAGE OF LUMBER
Original Filed Oct. 21, 1965  2 Sheets-Sheet 1
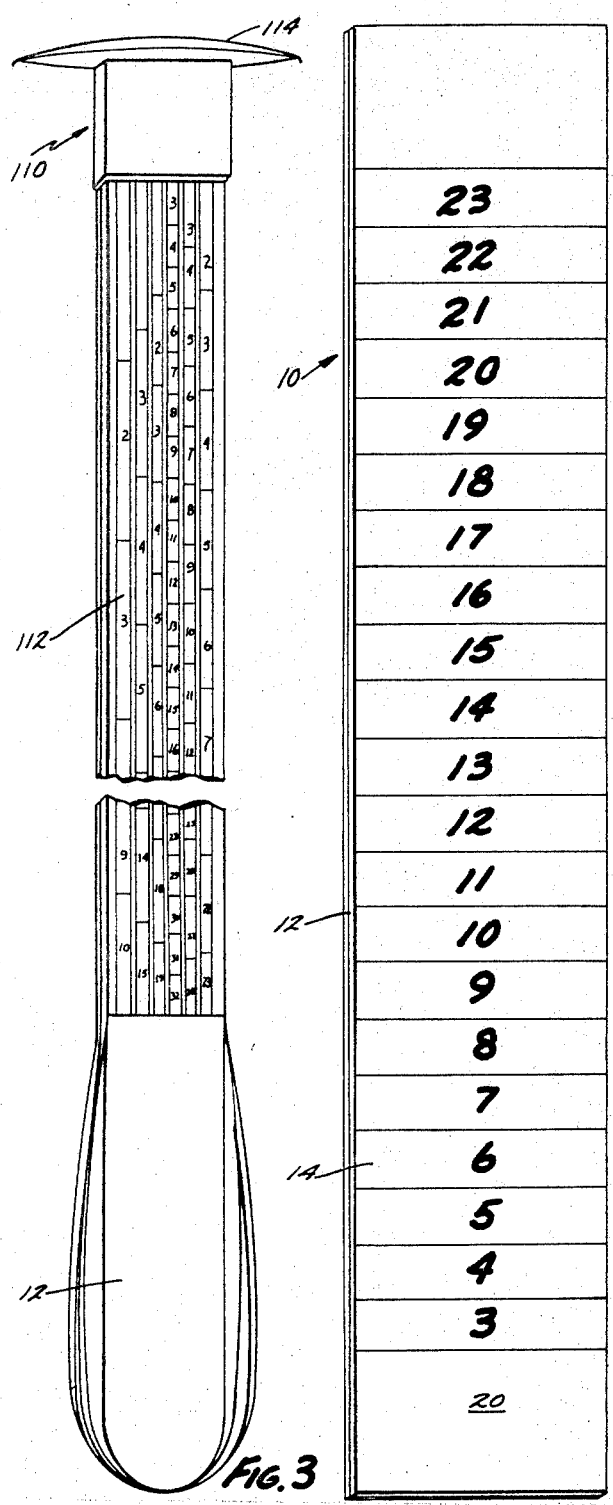
FIG. 1.
FIG. 3
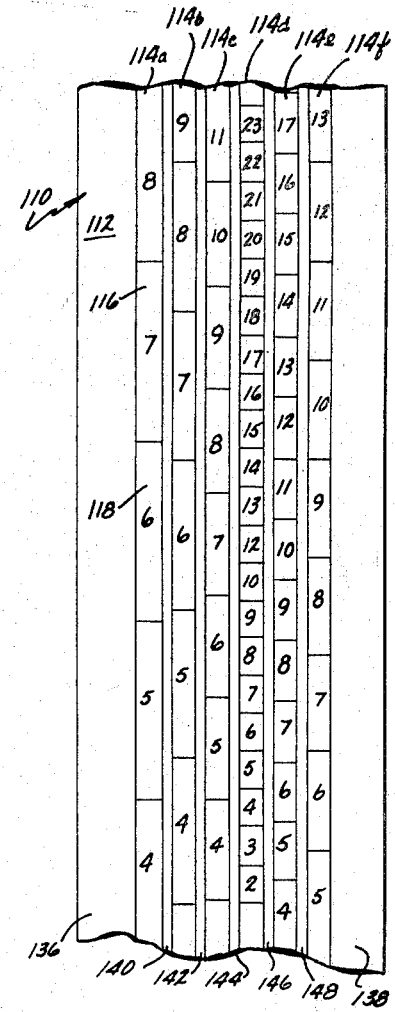
FIG. 4
INVENTOR.
EDWARD M. CONWAY
BY
ATTORNEYS Sept. 24, 1968 E. M. CONWAY 3,402,471
APPARATUS FOR MEASURING BOARD FOOTAGE OF LUMBER
Original Filed Oct. 21, 1965 2 Sheets-Sheet 2
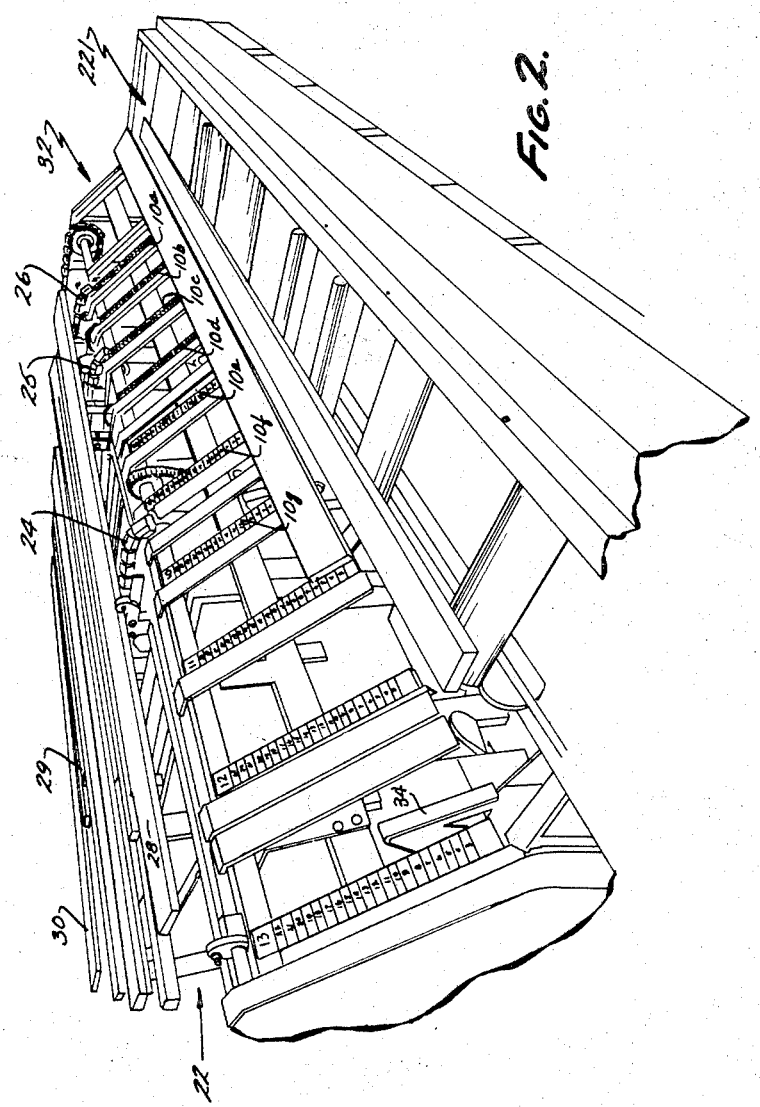
INVENTOR.
EDWARD M. CONWAY
BY
ATTORNEYS

United States Patent Office 3,402,471
Patented Sept. 24, 1968

3,402,471
APPARATUS FOR MEASURING BOARD FOOTAGE OF LUMBER
Edward M. Conway, Grand Rapids, Mich., assignor to Conway Lumber Rule Company, Grand Rapids, Mich., a corporation of Michigan
Original application Oct. 21, 1965, Ser. No. 500,141. Divided and this application July 14, 1967, Ser. No. 662,243
6 Claims. (Cl. 33—76)

ABSTRACT OF THE DISCLOSURE

Conveyor apparatus for moving pieces of lumber sideways over a plurality of measurement scales disposed transversely across the conveyor in mutually spaced parallel alignment, such that the lengths of each piece of lumber may be determined by the number of scales present between its ends and the widths of each such piece may be read from one of the scales which it moves over.

---

This application is a divisional application of the parent application entitled Apparatus for Measuring Board Footage of Lumber, filed Oct. 21, 1965, Ser. No. 500,141 by Edward M. Conway.

This invention relates to the measurement of the board footage of individual pieces of lumber, and more particularly to a new and unique apparatus for making such measurements, having greatly improved speed and efficiency.

In the lumber industry, soft woods of the type used for various building construction and the like are cut into predetermined standard sizes, and such lumber is referred to as "dimension lumber." Hardwood, on the other hand, is considerably more valuable than construction or dimension lumber, and is cut so as to produce the most useable wood and the least waste. Consequently, hardwood comes from the sawmill in widely varying lengths and widths, although most usually in standard thicknesses. Consequently, hardwood lumber must be accurately measured by the persons who process and utilize it for manufacturing purposes.

Merely by considering the vast amounts of hardwood lumber which are used annually in this country, it will be quite apparent that the various measuring or tallying operations by which the board footage of this lumber is determined, represent a sizeable and costly factor in the utilization of this wood. This is particularly true when the method of measurement which has heretofore been used in every known instance is considered. Basically, this method centers upon the use of a manual width scale which has been used in this country since the Civil War. This scale somewhat resembles a wooden yardstick which has a handle on one end and a flat blade on the other end, positioned perpendicular to the length of the scale. Each flat side of the scale has a number of measurement indicia in the form of several longitudinal series of small numerals and markings, which are burned into the wood and which are correlated to different lengths of lumber, so that when the scale is placed across a piece of lumber and the width of that piece is read at the appropriate indicia in the appropriate series, the reading is actually in board footage, subject of course to being multiplied by a thickness factor if that piece is of a size other than one inch thick. Scales of this nature are operated by hooking the blade on the far side of a piece of lumber and then bending the wooden scale by its handle so that the scale lies flat across the width of that piece of lumber. Also, the blade at the end of the scale may be used to flip pieces of lumber onto their opposite side, for inspection and the like.

Merely by stating the prevailing method of board footage determination in the foregoing manner, it should be clear that this method is extremely time-consuming and difficult and subject to error, since the different series of measurement scales are very close together and the markings very difficult to read, particularly since they so much resemble each other. While these difficulties are well known in the industry, and while it is also known that due to the value of hardwood lumber a measuring error in even a single carload may amount to several hundred dollars, the foregoing method of determining board footage has been the standard and, so far as is known, the exclusive one, with no changes or innovations of any note having occurred over the years.

Accordingly, it is a major object of the present invention to provide greatly improved automated measurement apparatus for determining the board footage of lumber, whose arrangement not only produces faster and more efficient operation, but which also reduces to the point of elimination the probability of making erroneous readings. The objects of the invention further include the provision of a greatly improved new form of measurement scale which is arranged to be used manually, and also the provision of both a new form of scale and a new manner of arranging a number of such scales, by which automated operations may be utilized for providing heretofore unknown speed, efficiency, and accuracy.

The foregoing major objects and advantages of the invention, together with numerous other objects and advantages no less a part thereof, will become increasingly apparent following consideration of the ensuing specification and its appended claims, particularly when taken in conjunction with the accompanying illustrative drawings setting forth preferred embodiments of the invention.

In the drawings:

FIG. 1 is an overhead perspective view of a first preferred embodiment of a scale device for automated operation;

FIG. 2 is a fragmentary frontal perspective view of a representative installation of the scales of FIG. 1, illustrating automated operation;

FIG. 3 is an overhead perspective view of a second preferred embodiment of the novel scale device, arranged for manual usage; and FIG. 4 is an enlarged, fragmentary plan view of a portion of the scale of FIG. 3, showing details of its construction and arrangement.

Briefly stated, the present invention provides a new concept for measuring scales for determining the board footage of lumber. The new scale comprises an elongate body structure having at least one series of successive measurement indicia on at least one side of the body structure and extending lengthwise thereof. Each of the indicia in each such series has a lengthwise extent which is correlated with a predetermined lumber length, such that by determining the width of a piece of lumber in terms of said indicia the board footage of that piece is automatically known. Each of the indicia in each such series further includes a vividly colored area having a color different from that of the adjacent indicia in that series, and each such indicia is preferably a solid block of such color which extends transversely across substantially the entire width of the body structure.

Moreover, the invention provides a composite apparatus for the automated measurement of board footage utilizing the foregoing measuring scale devices. This basically includes a conveyor means for moving pieces of lumber sideways through a measuring station, and a plurality of generally parallel measurement scales at the station aligned longitudinally with but spaced transversely across said conveyor means at predetermined distances. The said conveyor means is arranged to move the lumber over said scale arrangement, such that the width of the lumber may quickly be measured upon one or more of the scales and the length of the lumber may be determined by the number of spaced scales which lie between the ends of the piece of lumber. With accurate length and width measurements, the board footage of that piece of lumber is in effect determined.

Referring now in more detail to the drawings, the embodiment 10 of the present measuring scale seen in FIG. 1 includes an elongate body structure 12 which is generally flat in shape and which has a series 14 of successive adjacent measurement indicia such as 16 and 18 visible from one side thereof. As illustrated, each of the indicia such as 16 and 18 preferably extends across the entire width of the body structure 12, and the height or lengthwise extent of each of the indicia is to be determined in correlation with the particular length of lumber which a particular scale such as 10 is intended to measure, so that the measurements obtained by using the indicia actually read directly in board feet. That is to say, a separate scale such as scale 10 is to be used (in a manner explained subsequently) for measuring the board feet in each different length of lumber. This is in accordance with the practice in the hardwood lumber industry of ascribing a length measurement to pieces of lumber which is the next smallest even number of feet which that piece actually measures. For example, if a board is exactly twelve feet long, it is a twelve foot board. If a board is twelve feet, one-half inch long, it is a twelve foot board, and if a board is twelve feet, eleven and three-fourths inches long, it still is a twelve foot board. Consequently, since the usual range of hardwood lumber is from four to sixteen feet in length, a total of thirteen individual measurement scales is all that is required to cover the entire range.

As has been stated, the height or lengthwise extent of each of the indicia such as 16 and 18 is to be determined by the particular lumber length that the scale is intended to measure. For example, if the scale is to measure six foot long pieces of lumber (assuming that the lumber is one inch thick) the lumber must be at least two inches wide to contain a single board foot. If it is two inches or more wide but less than four inches, it will contain one board foot; if it is at least four inches wide but less than six inches, it will contain two board feet, and so on in accordance with width. Consequently, a scale 10 intended for six foot lengths of lumber will have a blank space 20 at its bottom two inches high with no indicia thereon, the first indicia will then be two inches in height or lengthwise extent, the second similarly two inches, and so forth. The exact height of different indicia on different scales intended for different lengths of lumber will thus be seen to vary in accordance with such lengths, so that the indicia on the scale will always read directly in board feet for the correct length of lumber. Consequently, it is desirable that each indicia be labeled with figures such as are seen in FIG. 1 which indicate the board footage of a piece of lumber whose width falls anywhere within a given indicia.

It is of utmost importance to point out that in accordance with the present invention each of the indicia on the various different scales is to be given a vivid color that is different from the color of the adjacent or succeeding indicia in that particular scale, such that each single indicia in each series upon a scale actually comprises a solid block of color. Such colors should preferably be of a bright and outstanding nature, and in addition to being different from the color of the adjacent indicia, the colors should be coded, as for example by being repeated only at each interval of ten indicia. For example, one very acceptable sequence of indicia would be green, pink, yellow, black, red, blue, silver, orange, violet, and gold, with the same sequence being then repeated for longer scales. Thus, if for example the three board foot indicia was green, the twelfth board foot indicia would be gold and the thirteen board foot indicia would again be green. Other than this, or a possible twenty-three board foot indicia, the color green would nowhere else appear in that particular series. Similarly, gold would appear for twelve board feet, twenty-two board feet, and the like, but nowhere else.

There is a definite reason for the presence of the indicated colors, and also for the coding of the colors. This reason has to do with human characteristics in visible recognition and decision-making, which has been found to be greatly facilitated with regard both to speed and accuracy when the delineation between adjacent indicia is a complete difference in color. The human response to such a situation is directly similar to that in a "go-no go" measurement system, i.e., the measurement clearly is one or the other, and the decision as to which is instantly arrived at. This is of a very considerabl importance in the measuring of hardwood lumber, since the inspectors who perform this operation spend most of their productive time in simply making a visual observation and deciding what it is that has been seen. Through the use of the present measuring scales, the efficiency of such an operation has been found to be improved by at least a factor of two to one, and more in most cases.

The body structure 12 is preferably made from a hard and generally rigid plastic substance such as acrylic plastic, and the series of indicia thereon is preferably provided by means of silk screen stenciling or printing of colored acrylic inks thereupon. By this procedure, the inks actually bond with the body structure into an integral unit. Moreover, the series of indicia is preferably covered by a hard and clear covering such as another layer of acrylic, indicated by the two layers shown in FIG. 1. The second layer is to be securely fixed to the body portion, as by bonding the two portions of plastic together.

The preferred arrangement for utilizing measuring scales of the nature just described is depicted in FIG. 2. A conveyor means 22 is provided which has a number of endless moving conveyor members such as 24, 25, and 26, usually referred to as skids, by which different lengths of hardwood lumber such as 28, 29, and 30 are moved edgewise toward a measuring station 32. The latter basically consists of a series of measuring scales 10a, 10b, 10c, 10d, 10e, and the like, each of which are aligned longitudinally relative to the conveyor and parallel relative to each other with a predetermined spacing between each, for example a one foot spacing. The arrangement of the scales 10 is such that scale 10a is positioned a distance from one side of the conveyor means corresponding to the first or minimum acceptable length of lumber (for example one foot). Scale 10b is then positioned one foot away from scale 10a, scale 10c is placed one foot from scale 10b, etc.

One end of each of the pieces of lumber such as 28, 29, and 30 is aligned by the conveyor means in transit, as for example by a conveyor element known as an "end aligner," of a type very well known. Further, the conveyor means 22 and the measuring station 32 are arranged such that the pieces of lumber are moved over the top of the measuring scales, preferably by inclining the parallel scales downwardly from the conveyor means, so that when the latter moves a piece of lumber to the top of the scales, the lumber slides downward thereover (or upon appropriate guides installed laterally of the scales), to rest with the bottom edge of the piece of lumber in alignment with the bottom of each of the scales, and with the piece of lumber lying flat against all of the scales between its end extremities. Thus, with the aligned ends of each of the succeeding pieces of lumber coming to rest at substantially the same position near the rightward end of the measuring station, the particular measuring scale immediately rightward of the opposite end of the piece of lumber will automatically indicate the effective length of that piece, i.e., the next smallest even one foot measurement.

The individual scales such as 10a, 10b, 10c and the like are to be positioned in accordance with the particular length of lumber with which the indicia on each are correlated, i.e., scale 10a in FIG. 2 would be for one foot lengths of lumber, scale 10b for two foot lengths, etc. Thus, the determination of the amount of board footage in each succeeding piece of lumber brought to the measuring station by the conveyor means is extremely easy. Firstly, the appropriate length scale is instantly perceived, and secondly the particular colored indicia block on that scale over which the edge extremity of that piece of lumber falls will very quickly be perceived. When it is remembered that each indicia actually reads directly in board foot units, it will be apparent that practically in a single glance requiring only an instant of time, an operator may with great accuracy measure the board footage of a steady succession of lumber moved by the conveyor means.

Once this measurement has been made, the conveyor means and the measuring station preferably provide an automatic means for lifting the piece of lumber away from the array of measuring scales and onto a continuation 22' of the conveyor means, which continues to move the lumber toward its ultimate destination. Such a removal means is easily provided through a series of pivotable rocker arms 34 positioned between adjacent scales, with the arrangement such that by either a manual or a timed automatic actuation, the rocker arms 34 pivot forward to move the length of lumber lying against the scales out of the way in time for the next succeeding piece of lumber to be deposited into place.

While the measured spacing of the parallel scales seen in FIG. 2 has certain clear advantages in and of itself in the measurement of lumber, the importance of the solid blocks of color forming the indicia on the measuring scales cannot be overemphasized. The average operator quickly learns the numerical sequence corresponding to the different colors, and the coding in units of ten over which colors are repeated. With a piece of lumber lying atop the vividly colored series of indicia, it is a completely obvious measurement process, the decision of which may positively be made in the shortest possible time.

A second preferred embodiment of the concepts underlying the measuring scale 10 seen previously are illustrated herein in FIGS. 3 and 4. This embodiment 110 is arranged for use as a hand or manual measuring device. Accordingly, it includes a handle portion 112 at one end thereof, and an indexing blade means 114 at the other end. The latter is secured so as to extend generally perpendicular from the body portion 112 of the scale, and it may be used for a variety of purposes including indexing the end of the measuring scale with an edge extremity of a piece of lumber. The particular embodiment 110 of the measuring scale preferably has a clear or transparent body portion 112 which is preferably made of the polycarbonate plastic substance known as "Lexan," since this substance seems to very satisfactorily provide the required properties of high tensile strength and impact resistance, along with the required transparency, heat resistance, and insensitivity to temperature variations.

As in the case of measuring scale 10 of FIG. 1, the manual embodiment 110 has colored indicia series arranged lengthwise of its body structure. However, in the case of the manual scale 110, a total of six indicia series 114a, 114b, 114c, 114d, 114e, and 114f are provided on each of the two sides of the body portion (FIG. 4). Further, the body portion and indicia series are preferably so arranged that the side extremities 136 and 138 between the edge of the body and the first indicia series found inwardly thereof, as well as a strip such as 140, 142, 144, 146, and 148 is provided between each two adjacent indicia series which is substantially transparent, and through which a view is provided. The indicia series such as 114a, 114b, etc. are each correlated with one of the standard lengths of lumber which will be encountered, and consequently, the separate indicia such as 116 and 118 in the various series thereof each vary in height or lengthwise extent in the same manner as did the separate indicia 16 and 18 of the scale 10 of FIG. 1. Also, while each of the separated indicia of the manual scale 110 do not extend completely across the width of the body portion, each such indicia nonetheless is a solid block of color, which is preferably coded in the same way as the indicia 16 and 18 of the scale 10. By providing a total of six different indicia series on each side of the scale 110, all but one of the expected normal lengths of lumber will be provided for, and in accordance with known procedures, one series may be chosen for use with a conversion factor to represent a multiple of the actual length for that particular indicia. For example, the series for the length of eight feet may actually be used to measure sixteen foot boards, simply by doubling the board footage measurement indicated thereby.

The basic construction of the scale 110 is very similar to that of scale 10 already discussed. That is, the body portion 112 is preferably made from a pair of fixedly secured layers of the aforementioned plastic material, each of which has previously been provided, on the side thereof which is to be positioned on the inside of the body portion, with the required six indicia series, preferably such that when the two layers are joined to form the body portion, the six indicia series on each will be positioned in direct alignment with each other, i.e., back to back, so that upon viewing either side of the scale, only one set of indicia series will be visible. As in the case of the scale 10, the indicia series on the manual scale 110 are preferably printed as by silk screen process. However, this is not to be construed as the only acceptable method of manufacture, since quite conceivably printed strips of materials relatively insensitive to temperature changes might be embedded between the two layers of body-forming material, as for example certain foils and the like.

Having now set forth in detail the structural features of my novel board footage measurement scales, and of the arrangement by which automated measurements of lumber may be made, many of the important advantages obtained through the invention will likely be apparent to those skilled in the art. The feature of the colored indicia in each measurement series is very important, for the reasons of human efficiency described hereinabove. Further, it will be noted that in both the scale 10 intended for automated usage and the scale 110 intended for manual usage, the indicia series are arranged so that the particular piece of lumber being measured actually appears on each side of the indicia series. As will be understood, this serves to considerably facilitate the measurement decision, since it is immediately apparent to even an unpracticed eye which particular indicia the edge portion of a piece of lumber lies within, and since each indicia actually represents a board foot measurement, the total determination of board footage in each particular piece of lumber requires only a single glance. Consequently, the present invention offers operating economies which are very substantial and which frequently will exceed one hundred percent.

It is quite conceivable that those skilled in the pertinent arts may, upon becoming familiar with the foregoing specification and the specific embodiments disclosed therein, conceive of certain other embodiments of the concept underlying the invention, or of certain modifications and alterations in the embodiments herein disclosed. All such embodiments, variations, and modifications which incorporate the concepts on the invention and which are clearly within its spirit are thus to be considered as within the scope of the claims appended herebelow, unless these claims by their language specifically state otherwise.

I claim:
1. Apparatus for the measurement of board footage of lumber, comprising in combination: conveyor means for moving pieces of lumber sideways through a measuring station; a plurality of generally parallel width measurement scales at said station; said scales aligned lengthwise with but spaced transversely across said conveyor means at predetermined distances; and said conveyor means arranged to move said pieces of lumber over said scales at said station such that the width of the lumber may be measured upon one or more of said scales and the length of a piece of lumber determined by the number of spaced scales lying between its ends.

2. The apparatus defined in claim 1, wherein said conveyor means is further arranged to align one end of each such piece of lumber at a predetermined position relative to said spaced scales, such that the lateral position of each scale denotes a known length measurement for the lumber.

3. The apparatus defined in claim 2, wherein each of said scales comprises an elongate body structure having a series of adjacent measurement indicia thereon which extends lengthwise thereof, each of said indicia in each series having a lengthwise extent which is correlated with and determined by the lumber length measurement which that scale is positioned to indicate, such that each indicia actually provides a measurement in terms of board feet; and each of said indicia including a vividly colored area of a color different from that of the adjacent indicia in that series, whereby the speed and accuracy of making such width determinations are greatly facilitated.

4. The apparatus defined in claim 3, wherein each indicia in each such series comprises a solid block of such color extending transversely across substantially the entire width of said body.

5. The apparatus defined in claim 4, wherein each of said scales includes a hard and substantially clear covering over said series of indicia, said cover being fixedly secured relative to said body.

6. The apparatus defined in claim 5, wherein the series of indicia on each such scale is color coded, such that the color of each indicia in each series is repeated only at intervals of ten indicia.

References Cited

UNITED STATES PATENTS

| | | | |
|---|---|---|---|
| 2,736,095 | 2/1956 | Krauss | 33—1 X |
| 3,264,878 | 8/1966 | Balog | 33—121 X |

HARRY N. HAROIAN, *Primary Examiner.*